United States Patent
Makino et al.

(10) Patent No.: US 8,924,744 B2
(45) Date of Patent: Dec. 30, 2014

(54) APPARATUS AND METHOD TO PUT LOGICAL RING IN LOW POWER MODE AFTER A SPECIFIC FUNCTION HAS BEEN PERFORMED

(75) Inventors: Masahiro Makino, Aichi (JP); Shinichi Yoshida, Aichi (JP); Osamu Inagaki, Aichi (JP)

(73) Assignee: Kabushiki Kaish Tokai Rika Denki Seisakusho, Aichi (JP)

( * ) Notice: Subject to any disclaimer, the term of this patent is extended or adjusted under 35 U.S.C. 154(b) by 401 days.

(21) Appl. No.: 13/187,032

(22) Filed: Jul. 20, 2011

(65) Prior Publication Data

US 2012/0030490 A1 Feb. 2, 2012

(30) Foreign Application Priority Data

Jul. 27, 2010 (JP) ................. 2010-168296

(51) Int. Cl.
| | |
|---|---|
| G06F 1/00 | (2006.01) |
| G06F 1/26 | (2006.01) |
| G06F 1/32 | (2006.01) |
| H04L 12/12 | (2006.01) |
| H04L 12/40 | (2006.01) |

(52) U.S. Cl.
CPC .............. *G06F 1/3203* (2013.01); *Y02B 60/34* (2013.01); *H04L 2012/40273* (2013.01); *H04L 12/12* (2013.01); *H04L 12/40039* (2013.01); *G06F 1/3287* (2013.01)
USPC .......................................... 713/300; 713/323

(58) Field of Classification Search
CPC .......................... G06F 1/3203; B60G 17/0195
USPC .............................................. 713/323; 701/48
See application file for complete search history.

(56) References Cited

U.S. PATENT DOCUMENTS

| | | | | |
|---|---|---|---|---|
| 6,484,082 | B1 * | 11/2002 | Millsap et al. | 701/48 |
| 2006/0281601 | A1 * | 12/2006 | Iida | 477/115 |
| 2010/0138493 | A1 * | 6/2010 | Natsume | 709/204 |
| 2010/0169717 | A1 * | 7/2010 | Sonoda et al. | 714/48 |
| 2010/0217791 | A1 * | 8/2010 | Nakamura | 709/201 |

FOREIGN PATENT DOCUMENTS

| | | |
|---|---|---|
| JP | 2006-042310 | 2/2006 |
| JP | 2007-030714 | 2/2007 |
| JP | 2008-113211 | 5/2008 |

OTHER PUBLICATIONS

Japanese Office Action for Japanese Publication No. 2008-113211, dated Jan. 7, 2014. English translation not provided.

* cited by examiner

*Primary Examiner* — Thomas Lee
*Assistant Examiner* — Robert Cassity
(74) *Attorney, Agent, or Firm* — Patterson Thuente Pedersen, P.A.

(57) ABSTRACT

A communication system includes a network formed by a plurality of control units, each operated in a high power consumption mode and a low power consumption mode. A selected one or more of the control units act solely or in cooperation with each other to implement a specific function. Each of the selected one or more of the control units related to the specific function is set in the high power consumption mode. Each of the non-selected control units unrelated to the specific function is set in the low power consumption mode.

7 Claims, 3 Drawing Sheets

Communication Frame 20

Network Management Frame 40

APPARATUS AND METHOD TO PUT LOGICAL RING IN LOW POWER MODE AFTER A SPECIFIC FUNCTION HAS BEEN PERFORMED

CROSS-REFERENCE TO RELATED APPLICATIONS

This application is based upon and claims the benefit of priority from prior Japanese Patent Application No. 2010-168296, filed on Jul. 27, 2010, the entire contents of which are incorporated herein by reference.

BACKGROUND OF THE INVENTION

The present invention relates to a communication system including a network formed by a plurality of control units.

The number of electronic control units (ECUs) installed in a vehicle has been increasing over these recent years. An in-vehicle communication network is formed so that data can be shared between the ECUs. In the in-vehicle communication network system of the prior art, when a single ECU transmits a communication frame on the network, the communication frame is shared by the other ECUs of the network. When an ECU determines that the communication frame is related to the ECU, the ECU performs a process that is in accordance with the communication frame.

Japanese Laid-Open Patent Publication Nos. 2006-42310 and 2007-30714 each disclose a technique that uses a network management frame, which differs from the communication frame described above, to manage a plurality of ECUs forming a network in a wake state (high power consumption mode) and a sleep state (low power consumption mode).

However, in the techniques disclosed in the above publications, the ECUs are switched between wake and sleep states in accordance with the network. That is, the ECUs forming a single network are all simultaneously switched at the same timing to a wake state or a sleep state. Although only one of the ECUs in a network requires being in a wake state to execute vehicle control, the other ECUs in the same network, which are unrelated to the executed vehicle control, are also all shifted to a wake state. This consumes unnecessary power.

SUMMARY OF THE INVENTION

It is an object of the present invention to reduce power consumption of a communication system.

One aspect of the present invention is a communication system comprising a network formed by a plurality of control units, each operated in a relatively high power consumption mode and a relatively low power consumption mode. A selected one or more of the control units act solely or in cooperation with each other to implement a specific function. Each of the selected one or more of the control units related to the specific function is set in the relatively high power consumption mode. Each of non-selected ones of the control units unrelated to the specific function is set in the relatively low power consumption mode.

Other aspects and advantages of the present invention will become apparent from the following description, taken in conjunction with the accompanying drawings, illustrating by way of example the principles of the invention.

DETAILED DESCRIPTION OF THE INVENTION

Figure 1:
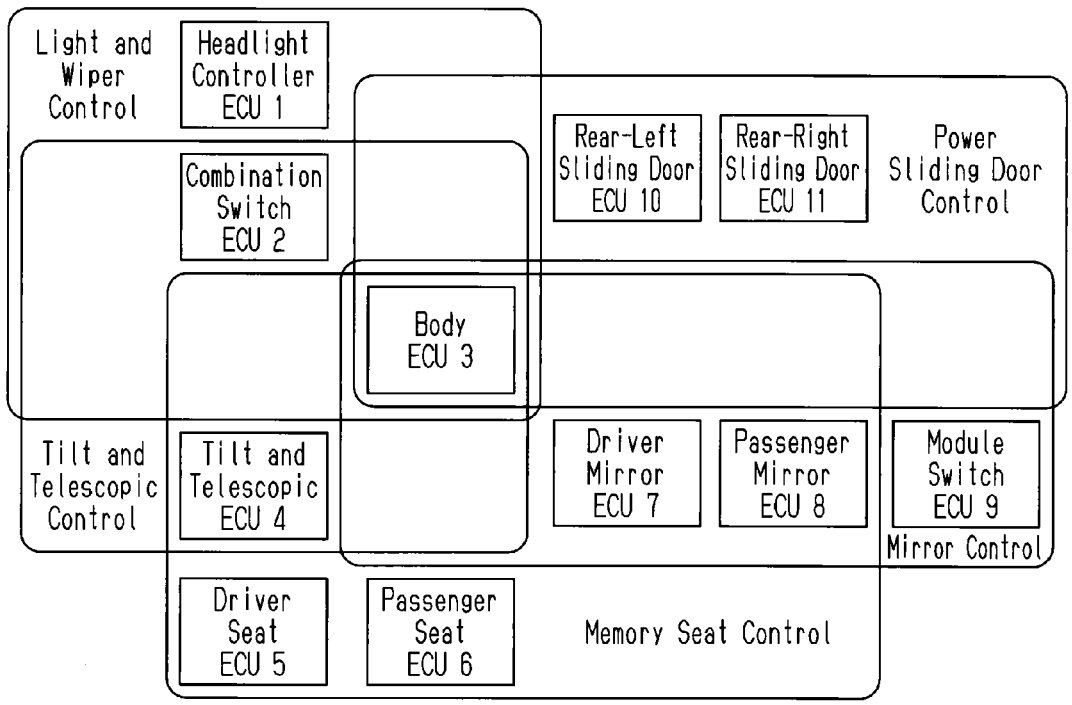
FIG. 1 is a block diagram showing an in-vehicle communication network, which is formed by a plurality of ECUs and included in a communication system according to a typical embodiment of the present invention.

Referring to FIG. 1, a plurality of ECUs, which include ECUs 1 to 11, are installed in a vehicle. A communication system of the present embodiment includes an in-vehicle communication network formed by the ECUs 1 to 11. A selected one or more of the ECUs act solely or in cooperation with each other to implement a specific function. For example, a headlight controller ECU 1, a combination switch ECU 2, and a body ECU 3 cooperate with one another to implement a light and wiper control function.

Some of the ECUs may be used to implement more than one function. For example, the combination switch ECU 2 is used to execute two controls, namely, light and wiper control and steering column position control (tilt and telescopic control). The body ECU 3 is used to execute five controls, namely, the light and wiper control, the steering column position control, a memory seat control, a mirror control, and a power slide door control.

Each of the ECUs 1 to 11 is operated in a high power consumption mode and a low power consumption mode. Here, ECU mode management is performed in accordance with function, such as the function related to the light and wiper control. The ECUs 1 to 11 are independently switched to the high power consumption mode (wake state) or the low power consumption mode (sleep state). For example, the headlight controller ECU 1, the combination switch ECU 2, and the body ECU 3, which are a group of ECUs related to the light and wiper control function, form a function group referred to as a logical ring. The logical ring is used to perform mode management in accordance with the so-called token passing technique.

Figure 2:
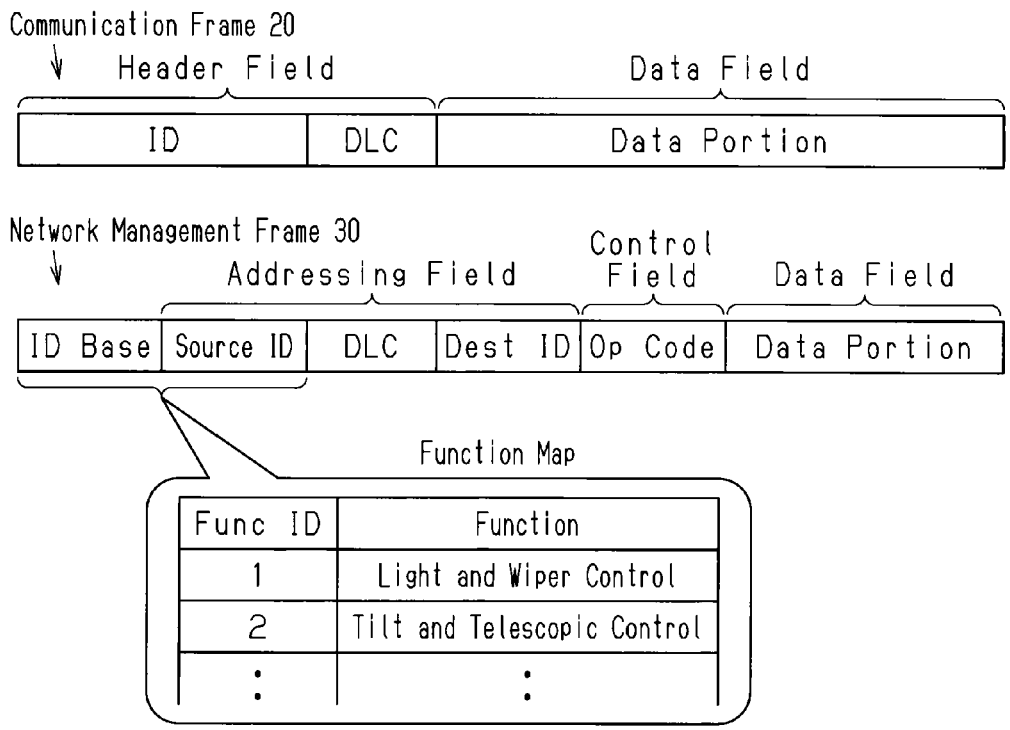
FIG. 2 is a diagram showing the data structures of a communication frame and a network management frame in a first embodiment.

Referring to FIG. 2, the token passing technique uses a network management frame 30, which differs from a communication frame 20. The communication frame 20 includes a header field and a data field. The header field includes identification information (ID), which specifies the contents of the communication frame, and a data length code (DLC), which indicates the length of the following data portion. The data field includes the data portion, to which data is written. When receiving the communication frame 20, each of the ECUs 1 to 11 refers to the ID in the communication frame 20, determines whether or not the communication frame 20 is related to the ECU, and, after making an affirmative determination, performs a process that is in accordance with the data portion.

The network management frame 30 includes an ID Base, an addressing field, a control field, and a data field. The ID Base, which is located at the head of the network management frame 30, indicates the frame type, that is, whether the frame is a communication frame 20 or a network management frame 30. The ID Base and a Source ID, which is included in the addressing field, form a controller area network (CAN) ID. The CAN ID includes a function ID (Func ID), which indicates the function the network management frame 30 is related to. In the CAN ID (ID Base and Source ID), an extension bit is prepared for the ID Base. In the present embodiment, the extension bit includes the Func ID. The Func ID may be a code such as "1" to "5" respectively associated with the five functions (refer to FIG. 1) of the vehicle.

In order for the ECUs 1 to 11 to recognize the associated function relationship and have the relationship reflected on mode management of the ECUs forming the logical ring, each of the ECUs 1 to 11 includes a memory circuit, such as a non-volatile memory, that stores a function map (refer to FIG. 2) associating Func IDs with functions in a one-to-one manner. For example, Func ID "1" is associated with the function related to light and wiper control. When each of the ECUs 1 to 11 receive the network management frame 30, a microcomputer (control circuit) of each ECU refers to the Func ID in the network management frame 30 and the stored function map, specifies the function associated with the FuncID, and determines whether the specified function is the function related to the corresponding ECU.

The addressing field includes the Source ID, which indicates the transmission-originating ECU, a data length code (DLC), which indicates the length of the network management frame 30, and a destination ID (Dest ID), which indicates the ECU to which a transmission right (token) will be transferred, that is, the ECU that receives the next transmission right. The control field includes an operation code (Op Code). The operation code includes a sleep permission bit and a sleep execution bit. The sleep permission bit is set to "1" when the corresponding ECU is permitted to shift to the low power consumption mode. When prohibiting such shifting, the sleep permission bit is set to "0". The sleep execution bit is set to "1" when the ECUs forming the corresponding logical ring are all instructed to shift to the low power consumption mode. When prohibiting such shifting, the sleep execution bit is set to "0".

The data field includes a data portion to which data is written. The data field is prepared so that the length of the network management frame 30 conforms to the length of the communication frame 20. Thus, data is substantially unwritten to the data portion.

ECU mode management will now be described using the function related to light and wiper control as an example. A logical ring is formed by a group of ECUs related to the light and wiper control function. Here, it is assumed that the ECUs 1 to 11 are all in the low power consumption mode (sleep state).

When there is a request for implementing a specific function, for example, when the headlight switch, which is included in the combination switch, is operated, the combination switch ECU 2 transmits the network management frame 30, which includes a Func ID of "1" and a sleep execution bit of "0", to the in-vehicle communication network. The ECUs 1 to 11 receive the network management frame 30. The microcomputer of each ECU analyzes the frame 30 and determines whether the function associated with Func ID "1" in the frame 30, namely, the light and wiper control function, is related to the corresponding ECU. In the illustrated example, the microcomputers of the ECUs 1 to 3, which are related to the light and wiper control, give an affirmative determination.

Further, the microcomputers of the ECUs 4 to 11, which are not related to the light and wiper control, give a negative determination.

The microcomputers of the ECUs 1 to 3 further analyze the network management frame 30. In accordance with the sleep execution bit of "0", namely, the sleep prohibition instruction, in the frame 30, while prohibiting shifting of the corresponding ECU to the low power consumption mode (sleep state), each microcomputer switches the corresponding ECU to the high power consumption mode (wake state). The microcomputers of the ECUs 4 to 11 do not further analyze the network management frame 30 and maintain the corresponding ECU in the low power consumption mode (sleep state). In this manner, only the ECUs related to the light and wiper control function shift to the high power consumption mode, and the ECUs that are not related to the light and wiper control function all remain in the low power consumption mode.

Figure 3:
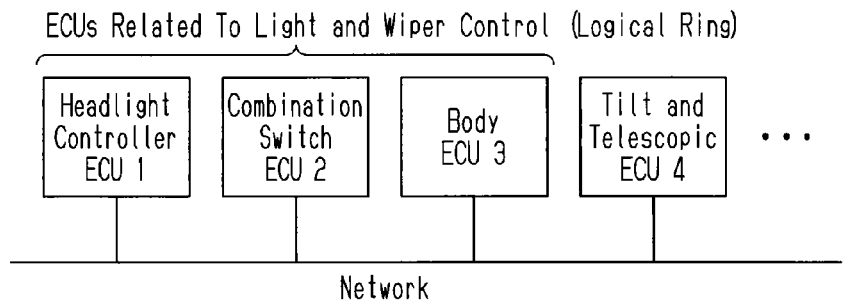
FIG. 3 is a block diagram showing a logical ring formed by ECUs 1 to 3, which are related to a light and wiper control function, and an ECU 4, which is unrelated to the light and wiper control function.
Figure 4:
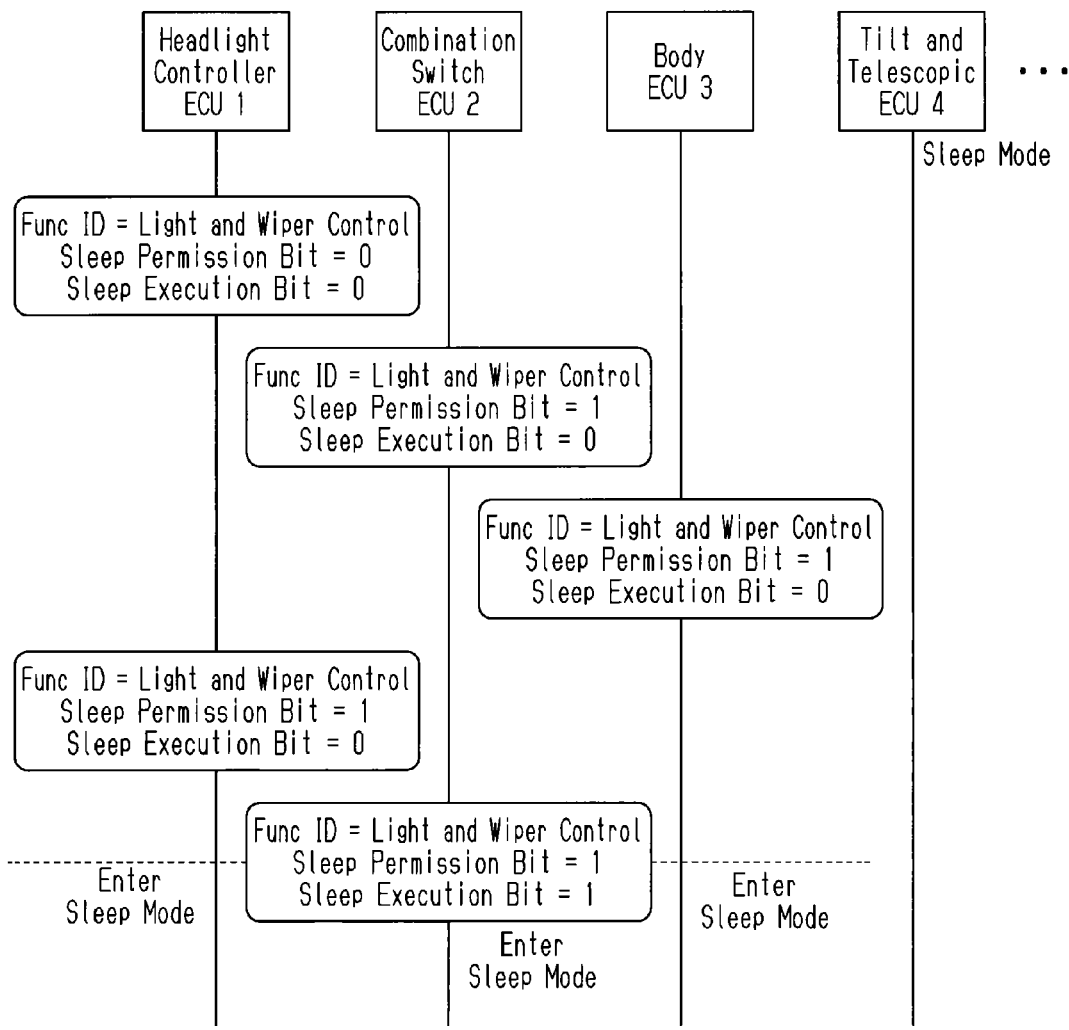
FIG. 4 is a timing chart showing an example of mode management for the ECUs 1 to 3, which are related to the light and wiper control function, and ECU 4, which is related to the light and wiper control function.

As shown in FIGS. 3 and 4, the ECUs 1 to 3, which are related to the function specified by the Func ID, form a logical ring. The ECUs 4 to 11, which are not related to the function specified by the Func ID, are not included in the logical ring. An operation for switching the ECUs 1 to 3 from the wake state back to the sleep state will now be described with reference to FIG. 4. The ECUs 4 to 11 do not implement the function related to the light and wiper control and thus remain in the sleep state.

For example, when a control in accordance with the operation of the headlight switch is still incomplete, among the ECUs 1 to 3 of the logical ring, the ECU 1 is not permitted to shift to the sleep state but the ECUs 2 and 3 are permitted to shift to the sleep state. When obtaining the transmission right, each ECU transmits the network management frame 30, which indicates the state of the ECU.

For example, when the ECU 1, which is not permitted to shift to the sleep state, obtains the transmission right, the ECU 1 transmits a network management frame 30 that includes the sleep permission bit of "0" and the sleep execution bit of "0". Then, when the ECU 2, which is permitted to shift to the sleep state, obtains the transmission right, the ECU 2 transmits a network management frame 30 that includes the sleep permission bit of "1" and the sleep execution bit of "0". Next, when the ECU 3, which is permitted to shift to the sleep state, obtains the transmission right, the ECU 3 transmits a network management frame 30 that includes the sleep permission bit of "1" and the sleep execution bit of "0". The ECUs 1 to 3 forming the logical ring all receive these network management frames 30 and thereby recognize the sleep permission bits of the ECUs 1 to 3.

Subsequently, when the control in accordance with the operation of the headlight switch is completed, the ECU 1 is permitted to shift to the sleep state. When the ECU 1, which is permitted to shift to the sleep state, obtains the transmission right, the ECU 1 transmits a network management frame 30 that includes the sleep permission bit of "1" and the sleep execution bit of "0". At this point of time, each of the ECUs 1 to 3 recognizes that the ECUs of the logical ring are all permitted to shift to the sleep state. Then, the ECU that obtains the transmission right (e.g., ECU 2) transmits a network management frame 30 that includes the sleep permission bit of "1" and the sleep execution bit of "1". In response to the sleep execution bit "1", namely, a sleep instruction, the ECUs 1 to 3 of the logical ring are switched to the sleep state.

The example of FIGS. 3 and 4 illustrate a case when implementing the function related to the light and wiper control. However, when an ECU is related to a plurality of functions like the body ECU 3, the ECU switches to the sleep state after determining that there are no related functions that need to be implemented. However, for the sake of convenience, it is preferable that the sleep permission bit be set to "1" in a network management frame 30 for a function that an ECU does not need to implement so that mode management can be performed in accordance with function.

The present embodiment has the advantages described below.

(1) The ECUs are set to the high power consumption mode in accordance with function and not in accordance with network or sub-network, and the ECUs that are not related to the function are set to the low power consumption mode. This reduces power consumption in comparison to the prior art in which the power consumption modes are switched in accordance with network or sub-network.

(2) For example, among the ECUs connected to the same network, only the ECUs related to a specific function are set to the wake state, and the remaining ECUs that are not related to the specific function are maintained in the sleep state. This is practical. In contrast, for example, in a structure that gives priority to setting ECUs that consume a large amount of power to the sleep state regardless of function, ECUs that are to be maintained in the wake state may be set to the sleep state. This lowers practicability.

(3) The ECUs 1 to 11 are each set to the high power consumption mode when one function or another needs to be implemented. This prepares the required ECUs 1 to 11 for implementation of the function. In contrast, the ECUs 1 to 11 are each set to the low power consumption mode when there is no need to implement any of the functions. This reduces power consumption of the entire network. Accordingly, power consumption is sufficiently managed.

(4) Mode management of the ECUs is performed in accordance with function by using the so-called token passing technique. The application of a known technique reduces power consumption without significant changes in the conventional controls. Further, the token passing technique is effectively used.

(5) The network management frame 30, which is transmitted in the token passing technique, includes function information (Func ID). Thus, even when the number of functions is increased and a complicated network is formed, an energy saving effect is obtained in a relatively simple manner for each function.

(6) Each ECU stores the function map. Thus, when the ECU receives transmission information (network management frame 30), the ECU easily and accurately determines whether or not the transmission information is related to the ECU.

(7) The power consumption of the vehicle is reduced. Thus, battery drainage is prevented when the vehicle is parked during which dark current flows.

(8) The Func ID is arranged near the head of the network management frame 30. Thus, each ECU may readily determine whether or not the network management frame 30 is for a function related to the ECU.

(9) The Func ID includes the CAN ID (ID Base and Source ID). Thus, a new dedicated bit does not have to be arranged in the network management frame 30, and the conventional network management frame 30 may be continuously used.

(10) Each of the ECUs 1 to 11 includes a memory circuit and a control circuit. The memory circuit stores a function map that associates function IDs (Func IDs) with functions in a one-to-one manner. When a network management frame 30 is received, the control circuit refers to the Func ID in the network management frame 30 and the function map in the memory circuit to determine whether the received network management frame 30 is related to the function of the corresponding ECU. Thus, the network management frame 30 is easily and accurately determined as whether it is related to the function of the corresponding ECU.

A second embodiment of the present invention will now be described. A communication system of the second embodiment differs from the communication system of the first embodiment in that the FUN ID is not included in the CAN ID (ID Base and Source ID) and is included in a dedicated bit additionally arranged in the network management frame 30.

Figure 5:
FIG. 5 is a diagram showing the data structures of a communication frame and a network management frame in a second embodiment.
Figure 5:
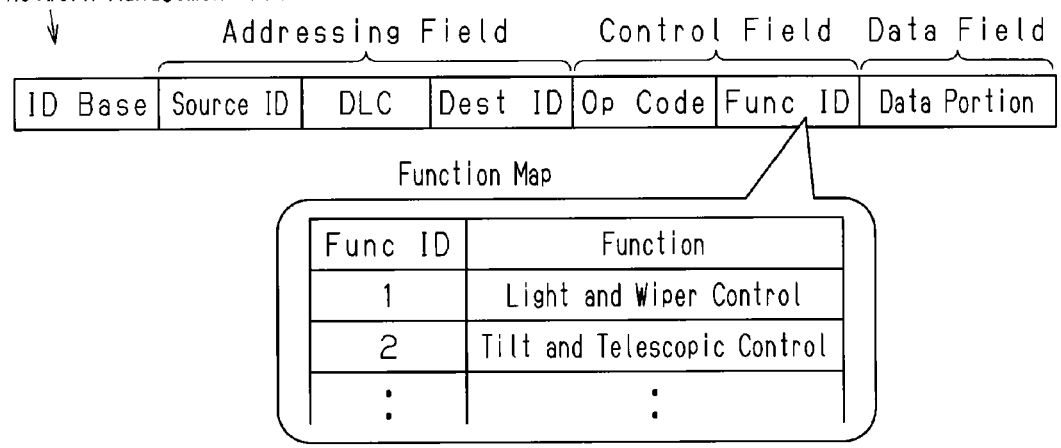

Referring to FIG. 5, the control field of the network management frame 40 includes a Func ID in addition to an Op Code. Accordingly, the CAN ID (ID Base and Source ID) includes a Func ID.

When the ECUs 1 to 11 receive the network management frame 40, in the same manner as in the first embodiment, each ECU analyzes the received network management frame 40 and determines whether or not the function associated with the Func ID included in the frame 40 is a function related to the ECU. When the ECU gives an affirmative determination, the ECU further analyzes the network management frame 40 and executes or prohibits shifting of the ECU to the low power consumption mode (sleep state) in accordance with a sleep execution bit (i.e., sleep prohibition instruction or sleep instruction) included in the frame 40.

In addition to advantages (1) to (7) of the first embodiment, the second embodiment has the advantage described below.

(10) The network management frame 40 has an additional dedicated bit including the Func ID. This allows for expansion of a network management frame.

It should be apparent to those skilled in the art that the present invention may be embodied in many other specific forms without departing from the spirit or scope of the invention. Particularly, it should be understood that the present invention may be embodied in the following forms.

The communication protocol is not limited to the controller area network (CAN) that performs the token passing technique performed and may be a local interconnect network (LIN) or FLEXRAY (registered trademark).

The communication system according to the present invention is not limited to a communication system for a vehicle and may be a communication system for a building such as a house or a store.

The present examples and embodiments are to be considered as illustrative and not restrictive, and the invention is not to be limited to the details given herein, but may be modified within the scope and equivalence of the appended claims.

The invention claimed is:

1. A communication system comprising a network formed by a plurality of control units, each operated in a relatively high power consumption mode and a relatively low power consumption mode, wherein a selected one or more of the control units act solely or in cooperation with each other to implement a specific function, each of the selected one or more of the control units related to the specific function is set in the relatively high power consumption mode, each of non-selected ones of the control units unrelated to the specific function is set in the relatively low power consumption mode, the selected one or more of the control units related to the specific function form a logical ring, among the selected one or more of the control units forming the logical ring, a control unit that obtains a transmission right transmits sleep permission information, which permits the control unit to shift to the relatively low power consumption mode, and information indicating a control unit that will next obtain the transmission right, and function information corresponding to the specific function, when the control units that form the logical ring all transmit the sleep permission information, the information indicating a control unit that will next obtain the transmission right, and the function information corresponding to the specific function, a control unit that obtains the transmission right from a control unit that finally transmitted the sleep permission information transmits sleep execution information, and the control units forming the logical ring are all set in the relatively low power consumption mode based on the sleep execution information.

2. The communication system according to claim 1, wherein each of the control units is programmed to act solely or in cooperation with another control unit to implement one or more functions, when any of the control units needs to implement one or more of functions the control unit is capable of implementing, the control unit is set in the relatively high power consumption mode, and when any of the control units has no need to implement any of the functions the control unit is capable of implementing, the control unit is set in the relatively low power consumption mode.

3. The communication system according to claim 1, wherein among the control units forming the logical ring, the control unit that obtains a transmission right transmits transmission information including the function information, which indicates the specific function, and sleep execution information, which instructs each of the control units forming the logical ring to shift to the relatively low power consumption mode, or sleep prohibition information, which instructs prohibition of shifting to the relatively low power consumption mode, and when each of the control units determines that the function corresponding to the function information included in the received transmission information is related to the control unit, the control unit is shifted to or prohibited from shifting to the relatively low power consumption mode in accordance with the sleep execution information or sleep prohibition information included in the received transmission information.

4. The communication system according to claim 1, wherein the transmission right is sequentially given to the selected one or more of the control units forming the logical ring, and the transmission right is not given to the control units, excluding the selected one or more of the control units, unrelated to the specific function.

5. The communication system according to claim 1, wherein in response to a request for implementing the specific function, each of the selected one or more of the control units related to the specific function is shifted to the relatively high power consumption mode, and each of the non-selected controls units that are unrelated to the specific function are shifted to the relatively low power consumption mode.

6. The communication system according to claim 1, wherein the selected one or more of the control units set in the relatively high power consumption mode form a logical ring, and the control units forming the logical ring each shift to the relatively low power consumption mode when implementation of the specific function is completed.

7. A communication system comprising:

a plurality of control units arranged on a communication network, the plurality of control units including first control units related to a first function, wherein the first control units operate in a relatively high power consumption mode to implement the first function, one of the first control units that obtains a transmission right transmits a first network management frame which contains sleep permission information and a function ID corresponding to the first function but does not contain a sleep instruction, after the first control units all transmit the first network management frame which contains the sleep permission information and the function ID corresponding to the first function but does not contain the sleep instruction, the first control units are all set in a relatively low power consumption mode in response to a second network management frame which contains the sleep permission information, the function ID corresponding to the first function, and the sleep instruction and is transmitted by one of the first control units that obtains a transmission right from the last one of the first control units that finally transmitted the first network management frame which contains the sleep permission information and the function ID corresponding to the first function but does not contain the sleep instruction.

* * * * *

UNITED STATES PATENT AND TRADEMARK OFFICE
CERTIFICATE OF CORRECTION

PATENT NO. : 8,924,744 B2
APPLICATION NO. : 13/187032
DATED : December 30, 2014
INVENTOR(S) : Masahiro Makino et al.

It is certified that error appears in the above-identified patent and that said Letters Patent is hereby corrected as shown below:

Title page, (73) Assignee:
      Please delete "Kabushiki Kaish Tokai Rika Denki Seisakusho, Aichi (JP)" and insert
-- Kabushiki Kaisha Tokai Rika Denki Seisakusho, Aichi (JP) --.

Signed and Sealed this
First Day of December, 2015

Michelle K. Lee
*Director of the United States Patent and Trademark Office*